United States Patent [19]

Cunningham et al.

[11] Patent Number: 4,780,508

[45] Date of Patent: Oct. 25, 1988

[54] METHOD OF EXTRUSION OF COMPOSITIONS OF LINEAR POLYETHYLENE AND POLYACETAL AND FILMS THEREOF

[75] Inventors: Theresa L. Cunningham, Manalapan, N.J.; Richard G. Shaw, Remsen, N.Y.; Tien-Kuei Su, Belle Mead, N.J.

[73] Assignee: Mobil Oil Corporation, New York, N.Y.

[21] Appl. No.: 139,413

[22] Filed: Dec. 30, 1987

[51] Int. Cl.[4] .............................................. C08F 82/80
[52] U.S. Cl. ................................ 525/164; 156/244.11; 428/500
[58] Field of Search .................... 525/164; 156/244.11; 428/500

[56] References Cited

U.S. PATENT DOCUMENTS

| | | | |
|---|---|---|---|
| 3,125,547 | 3/1964 | Blatz | 260/45.5 |
| 3,682,854 | 8/1972 | Bennahmias et al. | 525/164 |
| 4,076,698 | 2/1978 | Anderson et al. | 526/348.6 |
| 4,214,034 | 7/1980 | Kodera et al. | 428/315 |

FOREIGN PATENT DOCUMENTS 741163  5/1970  Belgium ............................. 525/164

*Primary Examiner*—Buffalow: Edith
*Attorney, Agent, or Firm*—Alexander J. McKillop; Michael G. Gilman; Michael J. Mlotkowski

[57] ABSTRACT

The extrudability of linear polymers of ethylene such as low density copolymers of ethylene and $C_4$-$C_{10}$ olefins (LLDPE) into thin films is improved by adding small amounts, e.g., 0.02 to 1 weight percent polyacetal fluoride to reduce melt fracture, head pressure and extruder torque.

15 Claims, No Drawings

METHOD OF EXTRUSION OF COMPOSITIONS OF LINEAR POLYETHYLENE AND POLYACETAL AND FILMS THEREOF

BACKGROUND OF THE INVENTION

Linear ethylene polymers such as low density polyethylenes (LLDPE) are widely used in the extrusion of films because of their superior properties compared to high pressure polyethylene (LDPE). However, there are persistent problems in the commercial exploitation of LLDPE resins due to difficulties in extrusion. For example, high back pressure and torque due to extremely high shear viscosity of the linear ethylene polymer are encountered. Futhermore, the extruded films exhibit surface distortion related to melt fracture. Accordingly, much effort has been devoted to finding additives, modifying extrusion conditions and changing die materials in order to alleviate some of the problems. For example, U.S. Pat. No. 3,125,547, which is incorporated by reference, discloses the use of a hexafluoropropylene-vinylidene fluoride copolymer as a film processing aid and broadly suggests a variety of other fluorinated polymers for the same purpose.

Films made from mixtures of polyethylene and at least one percent, but preferably somewhat more, of polyacetal resins, are disclosed in U.S. Pat. No. 4,214,034. The polyacetal resin is used to provide thermal insulation and its value as a processing aid or for any purpose at levels below one weight percent is not disclosed.

This invention relates to the use of polyacetal polymer in small amounts to improve the extrusion characteristics of linear ethylene polymers by reducing melt fracture and head pressure and extruder torque.

SUMMARY OF THE INVENTION

The extrudability of linear polymers of ethylene into thin films is improved by adding polyacetal polymer in small amounts, preferably less than 1 weight percent, sufficient to reduce melt fracture, head pressure and torque. The invention relates to both the method of reducing polymer compositions and films made by extrusion of the compositions.

DETAILED DESCRIPTION OF THE INVENTION

The linear ethylene polymers which are suitable for use in this invention are known materials which are widely commercially available. The preparation of suitable polymers is described in U.S. Pat. No. 4,076,698, which is incorporated herein by reference. Suitable polymers are generally prepared under low pressure conditions using Ziegler-Natta catalysts or chromium oxide catalysts. The linear polymers are either homopolymers of ethylene or copolymers of ethylene and higher alpha-olefins containing 4 to 10 carbon atoms. This invention is particularly concerned with linear low density polyethylenes which are copolymers having a density between 0.90 and 0.94, preferably between 0.91 and 0.93.

Suitable acetal resins are polyoxymethylene polymers or copolymers having polyoxymethylene units of the formula —HCHO—. Examples are polyformaldehyde (an acetal homopolymer) which is regarded as a polymer of formaldehyde, and acetal copolymers resulting from the copolymerization of ethylene oxide or dioxane with polyoxymethylene. The copolymers can be block or graft copolymers which have a polyoxymethylene chain as the main chain or side chain of the molecules and the remainder of the molecule can comprise ethylene, ethylene/vinyl acetate, ethylene/vinyl chloride, ethylene/vinyl chloride/vinyl acetate, ethylene/acrylic acid, ethylene/acrylate ester, acrylate ester, ethylene oxide, propylene oxide, propylene, butadiene or vinyl chloride.

Preferred acetal resins have a degree of polymerization of about 500 to about 3500 especially about 2,000 to about 3,500. Especially preferred are those in which up to about 3% weight, for example 1 to 3% by weight of a comonomer such as ethylene oxide is copolymerized in the polyoxymethylene molecules. If the degree of polymerization of the acetal resin in below about 2,000 especially below about 500, its viscosity becomes low, and uniform mixing of it with the polyethylene is difficult. If the degree of polymerization is about 3,500, the melting point of the acetal resin becomes too high. Inclusion of a comonomer such as ethylene oxide is preferred because the acetal resin is more chemically and thermally stable.

The polyacetal polymer can be blended with the linear ethylene polymer in any suitable manner. It has been found to be advantageous to prepare a masterbatch containing the linear ethylene polymer which is rich in the polyacetal polymer for blending with additional ethylene polymer to achieve the desired concentration of the additives.

The invention is illustrated by the following non-limiting example.

EXAMPLE

A ¾ inch Brabender extruder with a circular string die (diameter—0.062 inch) has been used to evaluate processability and extrudate quality. The LLDPE used in these examples is hexene copolymer of polyethylene (Mobil NTA-101; MI - 1, density=0.918 g/cm$^3$) and polyacetal is from Celanese (Celcon M-25-01; MI - 2.5). The incorporation of low levels of polyacetal significantly improves processability with a reduction of both head pressure and torque. Furthermore, the elimination of surface distortion of the extrudates is remarkable. The results are summarized in the Table.

TABLE

| Wt. Percent Polyacetal | RPM | Output Rate g/min. | Torque, Mg | Pressure, psi | Shear Rate sec$^{-1}$ | Melt Fracture |
|---|---|---|---|---|---|---|
| 0 | 30 | 13.6 | 3050 | 3400 | 98 | Yes |
|   | 50 | 24.0 | 4060 | 4050 | 172 | Severe |
|   | 80 | 38.3 | 4850 | 4340 | 276 | Severe |
| 0.1 | 50 | 18.1 | 2950 | 3390 | 130 | No |
|   | 80 | 32.3 | 3600 | 3760 | 233 | No |
|   | 90 | 38.7 | 3960 | 4000 | 279 | No |
|   | 100 | 41.6 | 4260 | 4050 | 400 | No |
| 0.25 | 50 | 18.8 | 3100 | 3310 | 135 | No |
|   | 80 | 26.3 | 3450 | 3650 | 189 | No |
| 0.5 | 50 | — | 3900 | 3140 | — | No |

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

We claim:

1. A composition comprising a linear polyethylene polymer and 0.02 to 0.8 weight percent of polyacetal polymer which is effective to reduce melt fracture when the linear polyethylene polymer is extruded into a thin film.

2. The composition of claim 1 in which said linear polyethylene polymer is a copolymer of ethylene and a higher olefin containing 4 to 10 carbon atoms, having a density of 0.90 to 0.94.

3. The composition of claim 1 in which said linear polyethylene is a copolymer of ethylene and butene having a density of 0.90 to 0.94.

4. The composition of claim 1 in which said linear polyethylene is a copolymer of ethylene and hexene having a density of 0.90 to 0.94.

5. The composition of claim 1 in which said linear polyethylene is a copolymer of ethylene and octene having a density of 0.90 to 0.94.

6. An extruded film comprising a linear ethylene polymer and 0.02 to 0.8 weight percent of polyacetal polymer, having reduced melt fracture compared to a film of the same polymer prepared in the same manner without said polyacetal polymer.

7. The film of claim 6 in which said linear polyethylene polymer is a copolymer of ethylene and a higher olefin containing 4 to 10 carbon atoms, having a density of 0.90 to 0.94.

8. The film of claim 6 in which said linear polyethylene is a copolymer of ethylene and butene having a density of 0.90 to 0.94.

9. The film of claim 6 in which said linear polyethylene is a copolymer of ethylene and hexene having a density of 0.90 to 0.94.

10. The film of claim 6 in which said linear polyethylene is a copolymer of ethylene and octene having a density of 0.90 to 0.94.

11. A method of reducing extruder torque in the extrusion of a linear polyethylene polymer into an article comprising including 0.02 to 0.8 weight percent of a polyacetal polymer with said linear polyethylene polymer.

12. The method of claim 11 in which said linear polyethylene polymer is a copolymer of ethylene and a higher olefin containing 4 to 10 carbon atoms, having a density of 0.90 to 0.94.

13. The method of claim 11 in which said linear polyethylene is a copolymer of ethylene and butene having a density of 0.90 to 0.94.

14. The method of claim 11 in which said linear polyethylene is a copolymer of ethylene and hexene having a density of 0.90 to 0.94.

15. The method of claim 11 in which said linear polyethylene is a copolymer of ethylene and octene having a density of 0.90 to 0.94.

* * * * *